Nov. 13, 1928. 1,691,813
H. KARABETZ
APPARATUS FOR ELECTRICALLY TRANSMITTING SIGNALS
INDICATING RESULTS OF OBSERVATION
Filed Dec. 19, 1925 2 Sheets-Sheet 1
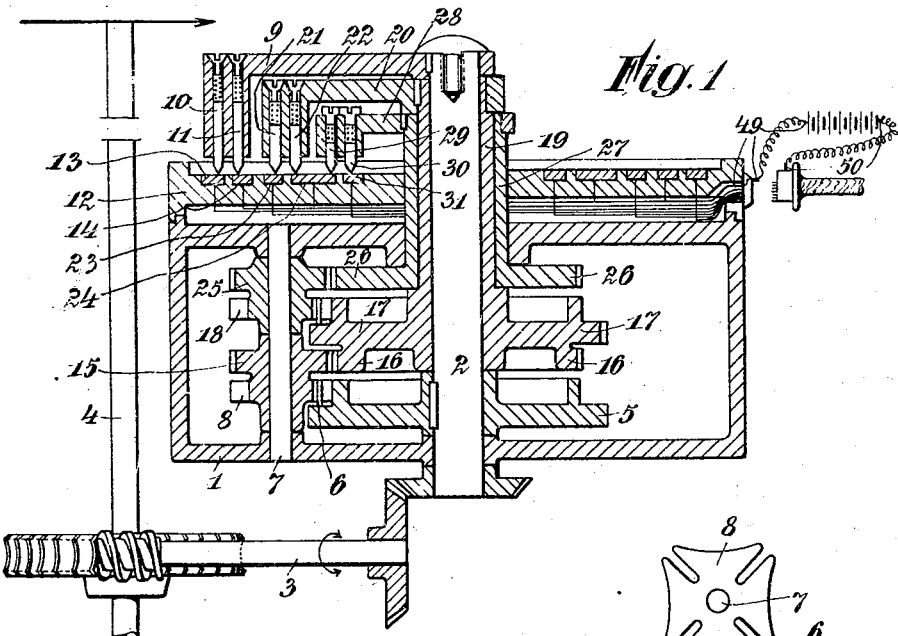
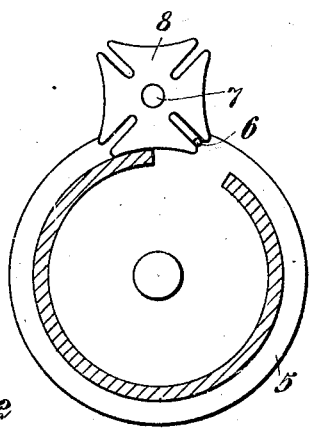
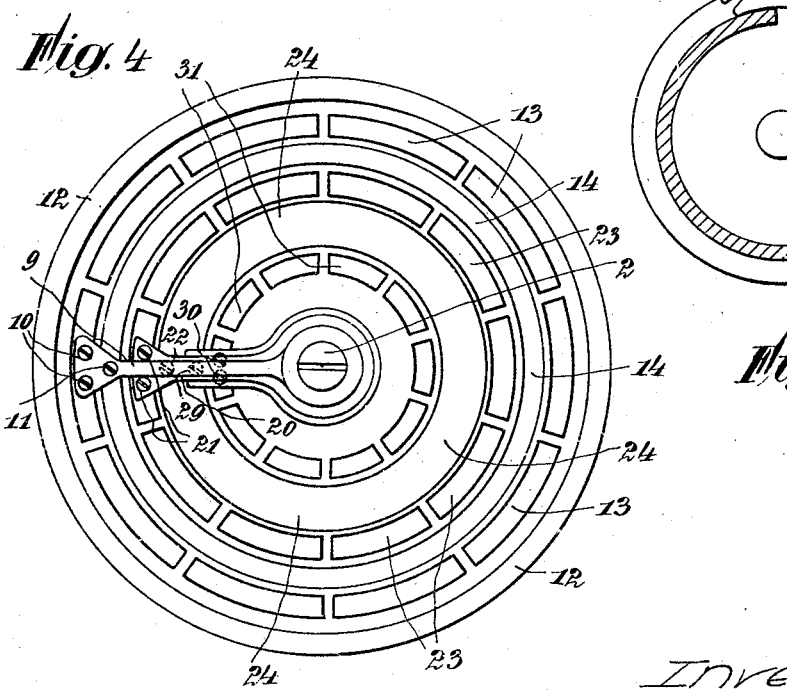
Inventor
H. Karabetz
by Langner, Parry, Card & Langner
Attys.

Nov. 13, 1928.
H. KARABETZ
1,691,813
APPARATUS FOR ELECTRICALLY TRANSMITTING SIGNALS
INDICATING RESULTS OF OBSERVATION
Filed Dec. 19, 1925 2 Sheets-Sheet 2
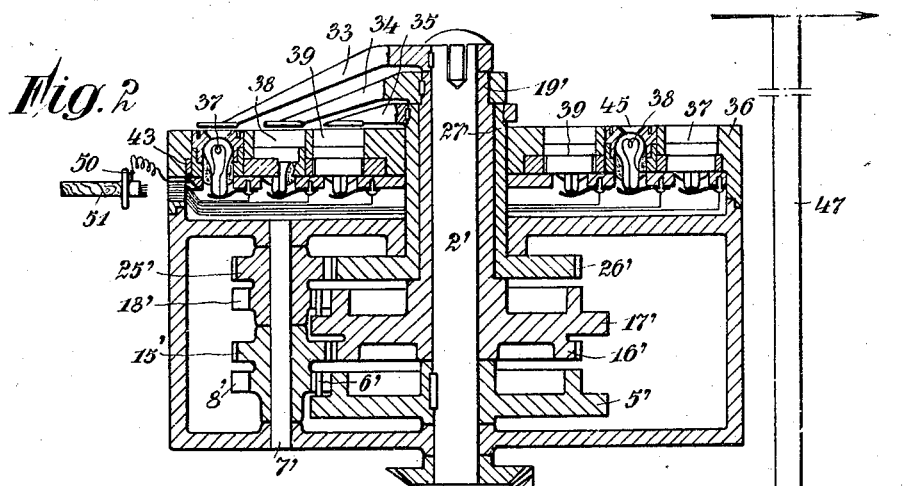
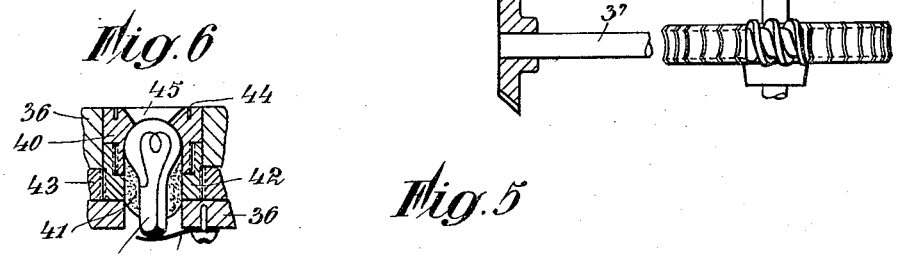
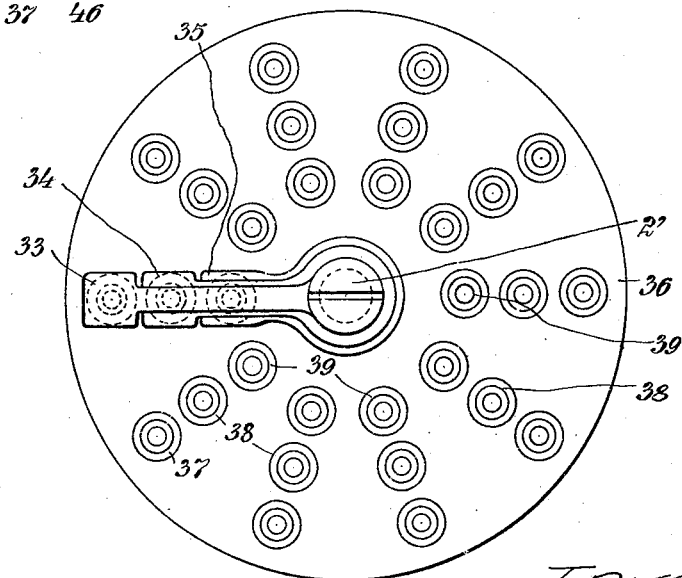
Inventor
H. Karabetz
by Langner, Parry Card & Langner
Attys.

Patented Nov. 13, 1928.

1,691,813

UNITED STATES PATENT OFFICE.

HANS KARABETZ, OF VIENNA, AUSTRIA, ASSIGNOR TO THE FIRM C. P. GOERZ, OPTISCHE ANSTALT AKTIENGESELLSCHAFT, AKCIOVA SPOLECNOST K. P. GOERZ OPTICKY USTAV, OF BRATISLAVA, CZECHOSLOVAKIA.

APPARATUS FOR ELECTRICALLY TRANSMITTING SIGNALS INDICATING RESULTS OF OBSERVATION.

Application filed December 19, 1925, Serial No. 76,401, and in Austria January 19, 1925.

My invention relates to apparatus for electrically transmitting signals, indicating results of observation at the transmitter station to a distant receiver station. The transmitter comprises a contact making apparatus and is electrically connected with the receiver comprising a signaling device.

The object of my invention is to provide a simple efficient and reliable apparatus by means of which the results of observation at the transmitter station can be rapidly indicated at the receiver station.

With this and other objects hereinafter more fully set forth my invention comprises firstly a transmitter with a gearing for a plurality of movable contact arms co-operating with the said gearing and with stationary contact in such a manner that one contact arm and the contacts of one group of stationary contacts closes a circuit after each unit of movement and each of the following contact arms and groups of contacts closes a circuit after a predetermined multiple of units of movement, and secondly of a receiver with a plurality of signals, preferably of optical signals which indicate at each moment the position of the stationary transmitter contacts which make contact with the associated movable contacts. Preferably I provide in the receiver movable arms adapted to be brought by hand into coincidence with the receiver signals for facilitating reading and I may also interpose between one of the said movable arms and the other ones a gearing so that only one of the said arms need be operated by hand whereby the other movable arms are moved automatically. I also may connect the hand operated movable arm by means of a suitable gearing with an indicator directly indicating the position of the object observed at the transmitting station or with an element such as the training gear of an ordnance or machine gun for imparting to the element or gun the desired position corresponding to the position of the object or target observed.

In the drawings an embodiment of my invention is shown by way of example.

Fig. 1 is an axial section of the transmitter.

Fig. 2 is an axial section of the receiver.

Fig. 3 is a transverse section of a Maltese cross gearing used in connection with both the transmitter and the receiver. Fig. 4 is a plan view of the transmitter and Fig. 5 is a plan view of the receiver.

Fig. 6 is an axial section of a signaling device.

The transmitter consists substantially of a plurality of movable contacts, a plurality of series of stationary contacts and a gearing by which each of the movable contacts are moved along one of the series of stationary contacts as hereinafter more fully explained.

2 is a shaft journalled in the casing 1 of the transmitter and operated from the outside in accordance with the adjusting gearing 3 of a pointer 4 of an angle measuring apparatus. Fast on the shaft 2 is a wheel 5 carrying a pin 6 engaging into a Maltese cross 8 loosely mounted on a counter shaft 7. The end of the shaft 2 projecting from the casing 1 carries a contact arm 9 which is provided with yielding downwardly extending contact pins 10 and 11, the contact pin 10 cooperating with insulated contact segments 13 arranged in a circle on the cover 12 of the casing and the contact pin 11 cooperating with a circular contact ring 14 on the same cover. Fast on the Maltese cross 8 is a pinion 15 engaging into a gear wheel 16 loosely mounted on the shaft 2 and carrying a pin 17 engaging into a Maltese cross 18 loose on the counter shaft 7. The hub of the gear wheel 16 forms a sleeve 19 concentric on the shaft 2. The end of the sleeve 19 extending beyond the casing 1 carries a contact arm 20 similar to the contact arm 9 and provided with two contact pins 21, 22 cooperating with a circle of stationary contact segments 23 and a contact ring 24 respectively. Fast on the Maltese cross 18 is a pinion 25 engaging into a gear wheel 26 loosely mounted on the sleeve 19 by means of a sleeve 27. The outer end of this sleeve carries a contact arm 28 with contact pins 29, 30 cooperating with the contact ring 24 above referred to and a circle of stationary contact segments 31. Assuming the Maltese cross is four leaved as shown in Fig. 3 then for each complete revolution of the wheel 5 the Maltese cross 8 and the pinion 15 fast on it will be turned through an angle of 90°. If now the number of teeth of the pinion 15 and the gear wheel 16 is in the ratio 1:2.5, then the ratio of angular speeds of the sleeve 19 and the contact pins 21, 22 carried by the same to the shaft 2 and the contact pins 10, 11 carried by it will be 1:10. Preferably the proportions of the gearing 16, 17, 18, 25, 26 is similarly selected so that the ratio of angular speeds of the contact arm 28 and the contact arm 9 will be $1:10 \times 10 = 1:100$. Therefore when the shaft 2 makes one complete revolution the contact arm 9 will sweep once over all the contact segments 10 associated thereto, while the contact arm 20 will have been moved through an angle of 36° and the contact arm 28 through an angle of 3.6°.

The construction of the receiver, Figs. 2 and 5 is similar to that of the transmitter. The gearing is enclosed in a casing 32; the various parts of the gearing are marked with the same numerals as the corresponding parts of the receiver, but for distinguishing these parts the numerals for the receiver are provided with a prime mark. The shaft 2' has keyed to it the wheel 6' provided with a pin 7' cooperating with a Maltese cross 8' having fast on it the pinion 15' and operating a sleeve 19' loosely mounted on the shaft 2' and further on the sleeve 27', the same as in the receiver. The ends of the shaft 2' and the sleeves 19' and 27' projecting from the casing 32 carry arms 33, 34, 35 respectively. In the cover 36 of the receiver casing 32 signaling lamps 37, 38, 39 are arranged in concentric circles and in distances from each other corresponding to the contact segments of the transmitter.

The signaling lamps used in the receiver are preferably constructed as follows (Figs. 5 and 6). The lamps are preferably mounted on insulating screw plugs 40 in which the bulb of the lamp is secured by any suitable metal filling 41. The screw plug 40 is screwed into a suitable electrically conductive nut and in contact with the metal filling 41. The plug 40 and the nut 42 have their outsides in a cylindrical surface and the nut 42 is provided with a male screw thread at its bottom end by means of which it can be screwed into a contact plate 43 countersunk in the cover 36. The insulating plug 40 is for this purpose provided with holes in its top face for engagement with suitable wrench pins and with a central bore 45 through which the light of the lamp can be seen from the outside. One terminal of the filament of the incandescent lamp is connected to the metallic filling 41 while the other terminal of the filament leads from the bulb neck to the spring contact 46 secured to the insulating cover plate 36. The shaft 21 is preferably operatively connected to the angle indicator 47 say with a pointer indicating the required training of an ordnance or gun. The Maltese cross gearing is advantageous for the reason that its intermittent movement results in an intermittent movement of the arms 33, 24, 25 so that the latter remain above the lamp lighted exactly as long until the latter is thrown out of circuit, whereby the arm is moved intermittently or step by step onto the next lamp lighted and covers the same.

For transmitting the current impulses required for signaling, a battery 48 is used, one terminal 49 of which is connected to the ring contacts 14 and 24 while the other terminal 50 of the battery is connected to the contact plate 43 into which all the lamps of the receiver are screwed by their nuts 42. The various contact segments of the transmitter are each connected with the corresponding lamp contacts 46 of the receiver by a wire. Preferably a cable 51 with the requisite number of wires is used when the distance between the transmitter and receiver is considerable, this cable being connected with the transmitter and the receiver and the battery in any suitable way.

The operation of the apparatus is briefly the following:

When the shaft 2 of the transmitter is turned, the contact arm 9 sweeps over the contact ring 14 and the contact segments 13 and the circuits of the corresponding signaling lamps 27 are closed in succession so that the lamps are lighted in succession. From the direction in which the lamps are lighted the one after the other, the direction of rotation of the contact arm of the transmitter may be observed at the receiver, and from the rapidity in which the successive lamps are thrown into circuit the speed of the movement of the contact arm of the transmitter may be estimated. When the transmitter shaft has made a complete revolution, the Maltese cross 8 is turned by the pin 6, whereby the contact arm 20 is turned through a certain angle, 36° in the example shown, so that such contact arm is moved from one contact segment 23 to the immediately adjacent one. The lamp corresponding to the former contact segment is thrown out of circuit, while the lamp 38 corresponding to the latter segment 23 is thrown into circuit and thus is lighted.

If now the arm 34 is turned so far that it covers the lamp 38 thus lighted and the arm 33 is turned so far that it covers the lamp 37 corresponding to the contact segment 13, the arms 33 and 34 will occupy exactly the same position as the corresponding contact arms, 9 and 20. Thus any positions to which the contact arms 9, 20, 28 may be brought at the transmitter station are clearly indicated by the arms 33, 34, 35 of the receiver provided that they are brought into such positions as to cover the lamps 37, 38, 39 just lighted. In case of a plurality of revolutions of the contact arm 9 of the transmitter, the contact arm 28 will be moved so far as to make contact with the next following contact segment 31 so that also the lamps 39 of the receiver come into operation and the third arm 35 also may be adjusted to exactly correspond to the position of the third contact arm of the transmitter. Thus the indicator 47 may be brought to the required position corresponding to the indicator 4.

In order to indicate also intermediate positions that is to say positions in which the contact arm is just between two contact segments of a circle, each contact arm is provided with two adjacent spring contact pins 10, 21 and 30 sweeping over the contact segments 13, 23, 31 the distance between the two spring contacts being such that they can bridge the insulation between successive contact segments so that in such an intermediate position two adjacent lamps are lighted.

It is particularly advantageous to make the casing and the gearing of the transmitter exactly alike those of the receiver so that these parts are interchangeable. Also the mountings of the lamps should be preferably such that each lamp may be removed from the cover plate by a suitable wrench without disturbing any other part of the receiver.

I wish it to be understood that the details of the construction and arrangements of parts may be varied within wide limits without departing from the present invention. Thus the number of circles of concentric contact segments and the corresponding number of lamp circles may be varied as circumstances may require. In such case the number of Maltese crosses and associated pinions and gear wheels will have to be varied to correspond. Also instead of Maltese cross gearings any other gearing may be used. Instead of the lamps other optical signaling apparatus or stop pins actuated electrically may be used.

In practice the shaft 2 of the transmitter may be operated by an apparatus for observing a movable object such as a target, while the shaft 2' of the receiver may operate a training gear by a shaft 47 Fig. 2, for an ordnance or machine gun.

What I claim is:

1. In apparatus for electrically transmitting signals indicating results of observations, the combination of a transmitter, comprising a plurality of rotatable contact arms operatively connected by gearings adapted to impart to the following contact arm a unit of movement when the immediately preceding arm makes a plurality of units of movement and stationary contact rings, each consisting of a plurality of contact segments and co-operating with one of the said rotatable contact arms, with a receiver, comprising a plurality of concentric groups of stationary signals, each signal corresponding to one of the contact segments of the transmitter and being directly electrically connected thereto, radial arms one for each of the said groups of signals and means for bringing to coincidence each of the radial arms with the signal of its corresponding group, and with a source of electricity adapted to supply current to the signaling devices of the receiver through the contact arms and segments of the transmitter so that the attendant of the receiver knows at any time the position of the transmitter, the direction and speed of rotation of the contact arms, the point on which the radial arms of the receiver have to be adjusted and the difference existing between the former indication and the next following.

2. In apparatus for electrically transmitting signals indicating results of observations, the combination of a transmitter, comprising a plurality of rotatable contact arms operatively connected by gearings adapted to impart to the following contact arm a unit of movement when the immediately preceding arm makes a plurality of units of movement, such gearing comprising a Maltese cross and a pinion secured thereto the two being loosely mounted on a counter shaft and a wheel with a pin adapted to engage the said Maltese cross and a gear wheel meshing with the said pinion and fast on a sleeve coaxial with and loosely rotatable on the said shaft and stationary contact rings, each consisting of a plurality of contact segments and co-operating with one of the said rotatable contact arms, with a receiver, comprising a plurality of concentric groups of stationary signals, each signal corresponding to one of the contact segments of the transmitter and being directly electrically connected thereto, radial arms, one for each of the said groups of signals and means for bringing to coincidence each of the radial arms with the signal of its corresponding group, and with a source of electricity adapted to supply current to the signaling devices of the receiver through the contact arms and segments of the transmitter so that the attendant of the receiver knows at any time the position of the transmitter, the direction and speed of rotation of the contact arms, the point on which the radial arms of the receiver have to be adjusted and the difference existing between the former indication and the next following.

3. In apparatus for electrically transmitting signals indicating results of observations, the combination of a transmitter, comprising a plurality of rotatable contact arms operatively connected by gearings adapted to impart to the following contact arm a unit of movement when the immediately preceding arm makes a plurality of units of movement and stationary contact rings, each consisting of a plurality of contact segments and co-operating with one of the said rotatable contact arms, with a receiver, comprising a plurality of concentric groups of stationary signals, each signal corresponding to one of the contact segments of the transmitter and being directly electrically connected thereto, radial arms, one for each of the said groups of signals, such arms being operatively connected by gearings adapted to impart to the following radial arm a unit of movement when the immediately preceding radial arm makes a plurality of units of movement whereby each of the radial arms is brought into coincidence with the signal of its corresponding group, and with a source of electricity adapted to supply current to the signaling devices of the receiver through the contact arms and segments of the transmitter so that the attendant of the receiver knows at any time the position of the transmitter, the direction and speed of rotation of the contact arms, the point on which the radial arms of the receiver have to be adjusted and the difference existing between the former indication and the next following.

4. In apparatus for electrically transmitting signals indicating results of observation the combination of a transmitter comprising a shaft, a plurality of rotatable contact arms, the first one of which is fast on such shaft gearings operatively connecting with each other successive contact arms such gearing comprising a Maltese cross and a pinion secured thereto, the two being loosely mounted on a counter shaft and a wheel with a pin adapted to engage the said Maltese cross and a gear wheel meshing with the said pinion and fast on a sleeve coaxial with and loosely rotatable on the said shaft and stationary contact rings, each consisting of a plurality of contact segments and co-operating with one of the said rotatable contact arms, with a receiver, comprising a plurality of concentric groups of stationary signals, each signal corresponding to one of the contact segments of the transmitter and being directly electrically connected thereto, radial arms, one for each of the said groups of signals, a hand operated shaft, concentric to such circular concentric groups of signals, the first of such radial arms being fast on the receiver shaft, gearings operatively connecting with each other, successive radial arms of the receiver, such gearing comprising a Maltese cross and a pinion secured thereto, the two being loosely mounted on a counter shaft and a wheel with a pin adapted to engage the said Maltese cross of the receiver and a gear wheel meshing with the last named pinion and fast on a sleeve coaxial with and loosely rotatable on the said receiver shaft whereby each of the radial arms is brought into coincidence with the signal of its corresponding group, and with a source of electricity adapted to supply current to the signaling devices of the receiver through the contact arms and segments of the transmitter so that the attendant of the receiver knows at any time the position of the transmitter, the direction and speed of rotation of the contact arms, the point on which the radial arms of the receiver have to be adjusted and the difference existing between the former indication and the next following.

In testimony whereof I have affixed my signature.

HANS KARABETZ.